June 1, 1926.
E. W. ACKERMAN ET AL
1,587,207
SHOCK ABSORBER
Filed June 23, 1925      2 Sheets-Sheet 1
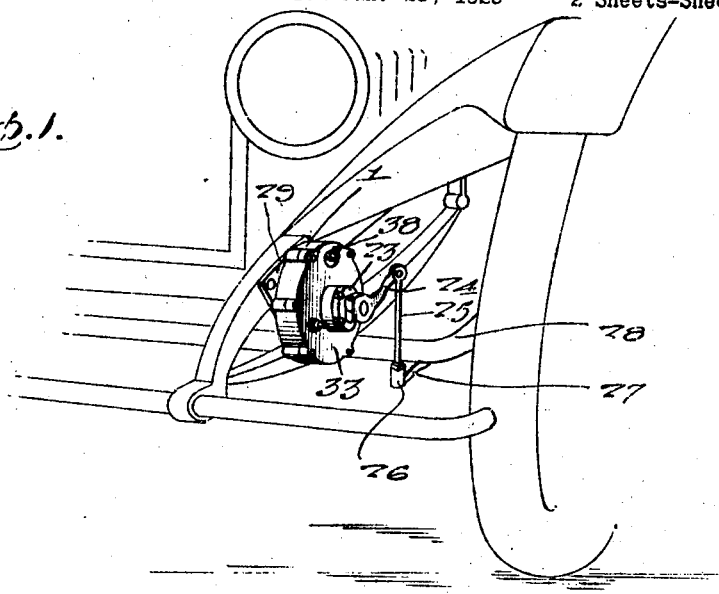
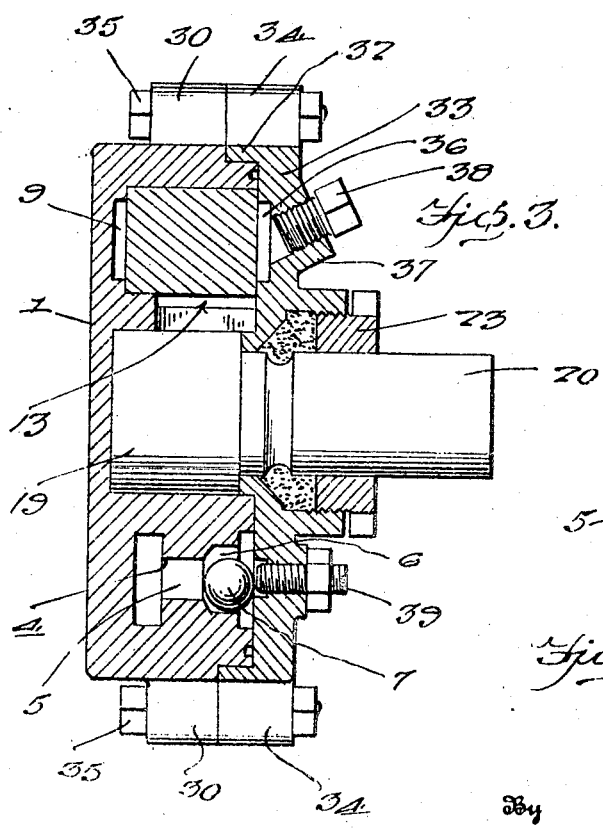
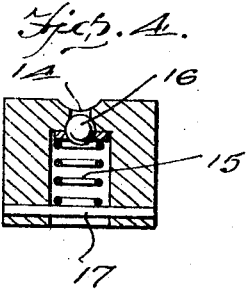
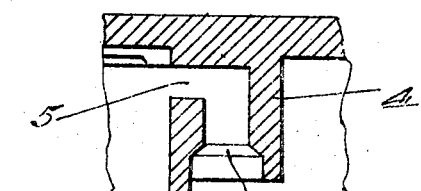
Inventors
E. W. Ackerman
G. C. Nicholson
By
Clarence O'Brien
Attorney June 1, 1926.
E. W. ACKERMAN ET AL
1,587,207
SHOCK ABSORBER
Filed June 23, 1925
2 Sheets-Sheet 2
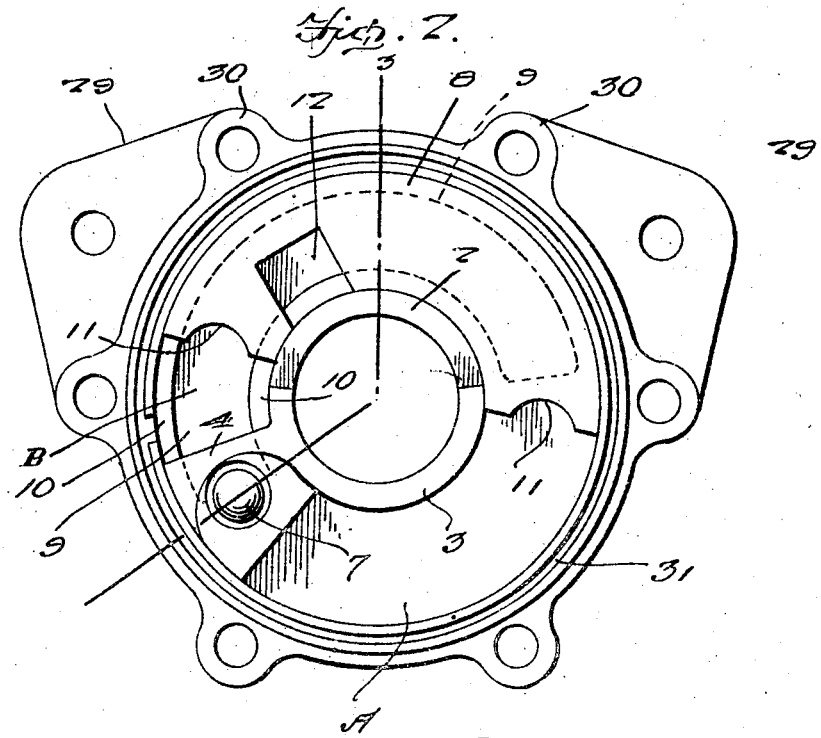
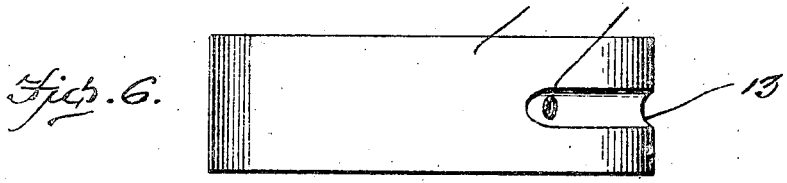
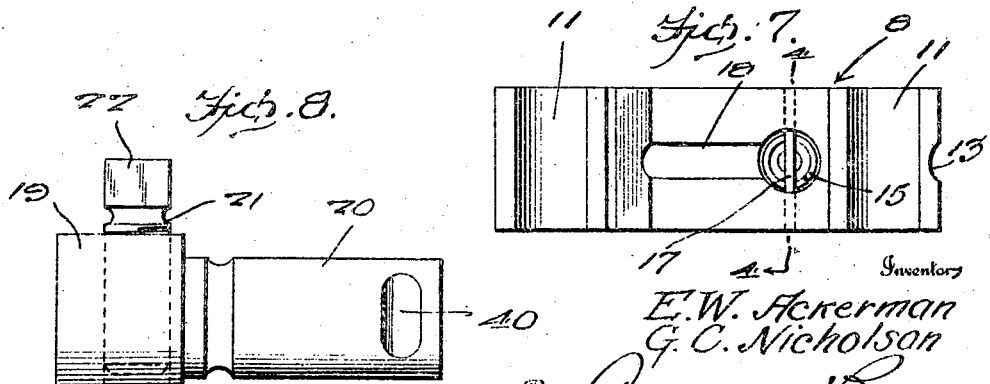
Inventors
E. W. Ackerman
G. C. Nicholson
By Clarence A. O'Brien
Attorney Patented June 1, 1926.

1,587,207

UNITED STATES PATENT OFFICE.

ERNEST W. ACKERMAN AND GRIFFITH C. NICHOLSON, OF MONROE, MICHIGAN.

SHOCK ABSORBER.

Application filed June 23, 1925. Serial No. 39,081.

This invention relates to an improved shock absorber for automobiles, the same being adapted to be used in conjunction with the usual leaf spring to allow the spring to return to its normal position in a manner to substantially eliminate the violent rebound ordinarily experienced.

It is our principal aim to generally improve upon a shock absorber of similar construction, embodied in Patent #1,529,680, granted to us on March 17, 1925.

Referring to that patent, it will be observed that springs, straps, and other known contrivances have been supplanted by a structure which operates upon a fluid pressure principle. More particularly, the patented device embodies a casing in which an oil or other fluid is placed, the casing being divided by a stationary abutment into separate chambers. Movable in these chambers is an arcuate piston, operated through the medium of a crank arm and shaft connected directly to the axis of the vehicle chassis. The abutment is provided with an automatically operable valve which functions to control the passage of the fluid from one chamber to the other, under the action of the moving piston, this operation of parts serving to place the fluid under pressure, thus retarding the return of the spring to its normal position.

In carrying out the present invention, we have evolved an analogous structure, characterized by features which serve to render it more positive and efficient in operation and considerably more sensitive to slight movement of the body and chassis, not altogether taken care of by the previously designed structure.

As will be seen later, one of the valves in the present structure is rearranged in a manner to facilitate transfer of the liquid under pressure from one chamber to the other through the medium of a valved passage in the piston itself, thus forming an excessive pressure relief valve.

Furthermore, a more convenient means is provided for regulating the operation of the main ball check valve in the abutment. Moreover, the present chamber is of such construction that friction between its surfaces and the pistons is reduced to a minimum, thus rendering the device more susceptible to easy operation from the slightest relative movement of the body and axle.

Other features, resulting in advantages, will become apparent from the following description and drawings.

In the accompanying drawings, forming a part of this specification, and in which like reference characters indicate corresponding parts throughout the same:—

Figure 1 is a perspective view of the forward portion of an automobile, showing a semi-elliptic spring, the body and axle and the improved shock absorber in associated relation therewith, the manner of mounting being plainly indicated.

Figure 2 is a top plan view of the casing, with the cover and oscillatory rock shaft removed.

Figure 3 is a central section, through the complete device, showing certain of the details in elevation.

Figure 4 is a detail section, taken approximately upon the plane of the line 4—4 of Figure 7.

Figure 5 is a fragmentary detail view of the abutment and valve seat.

Figure 6 is a side elevation of the piston.

Figure 7 is a similar view, observing the opposite side thereof.

Figure 8 is a detail elevational view of the rock shaft.

Referring to the drawings in detail, the reference character 1 designates the casing which, as shown, is substantially cup-shaped. At its center, the casing is provided with an upstanding hub, one half 2 of which is cutaway to leave the remaining half 3 standing to provide a guide. This divides the casing into a substantially annular marginal space. Formed integral with the solid portion 3 of the hub and bridging the annular space, is a portion 4, which will be hereinafter designated as an abutment. Noting Figures 3 and 5, it will be seen that this abutment is formed with an angular bore 5 providing a passage for the pressure forming fluid. In its top, the abutment is fashioned, as at 6, with a valve seat, for a ball check valve 7. Obviously, the portions of this abutment serve to divide the annular space into what may be conveniently referred to as separate oil compartments or chambers. This division is made more prominent by the presence of substantially arcuate solid piston 8, of a size to be snugly confined between the walls of the hub and casing. From Figure 2, it will be seen that the bottom of one chamber is recessed, as at 9, to provide a substantially semi-circular oil collecting pocket. The provision of this pocket also defines marginal portions 10, serving as rests for the sliding piston. As before indicated, this construction eliminates undue friction between the piston and the portion of the casing which it contacts. Referring again to the piston, it will be seen that the opposite ends are provided with notches 11, and that a polygonal pocket 12 is formed in the inner periphery. Furthermore, in the outer periphery, a groove 13 is formed. This groove extends through one end of the piston, inwardly toward the center and leads to a part 14, which in turn leads into a socket formed in the piston. Located in this socket (see Figure 4) is a coiled spring 15, which serves to press a relatively small ball check valve 16 outwardly, in a manner to close the port 14. The pin 17 spans the open end of the spring socket and one end of the spring rests thereon to be held normally in place, (see also Figure 7). In the last named figure a complemental groove 18 is provided, this communicating with the aforesaid pocket 12. Obviously, these grooves function together to provide a valved oil return, or an excessive pressure relief passage.

Considering more particularly Figures 3 and 8, it will be seen that the enlarged head 19 on the inner end of the rock shaft 20 is seated for rotation in the aforesaid head. This head is of a size to terminate substantially flush with the parts of the high semi-circular wall of the hub. The head 19 is formed with a screw threaded socket and the bolt 21 is tapped into this socket, the bolt having a head 22, of a size to permit it to be fitted snugly in the pocket 12 of the piston. This affords the operating connection between the rock shaft and the piston. The rock shaft extends outwardly through an appropriate stuffing box 23, and in practice, a crank arm 24 is clamped thereon. The crank arm is connected with a depending link 25 and this link is connected, through the medium of a universal connection 26 with a bracket 27, fastened firmly to the axle 28. The casing is provided with apertured flanges 29, by means of which it is bolted to the body of the car, as is shown in Figure 1.

In addition, the casing is provided with circumferentially spaced bored lugs 30. Furthermore, the open side has a packing groove 31 formed therein. It should be noted that the grooved portion is spaced slightly inward to permit the rim 32 of a removable cover 33 to overhang it and to afford a very tight closure. In this connection, the cover is provided with complemental bored lugs 34, cooperating with the first named lugs, and serving to permit passage of the clamping bolts 35 therethrough.

From Figure 3 it will be evident that the under side of the cover over the semi-circular oil pocket 9 is grooved, as at 36, to provide a complemental pocket and to relieve friction on the piston. Also, a screw threaded filler opening 37 is provided here, and a plug 38 is screwed into this opening. At a substantially diametrically opposite point, a screw threaded valve regulating stem 39 is arranged, it being the purpose of this stem to feed in or out to regulate the size of escape opening or groove in the cover according to action desired. Although it is not essential, the free end portion of the rock shaft 20 is provided with a transverse key way 40, for reception of a clamping bolt used for connecting the clamp head of the arm 24 upon the shaft (see Figure 1).

From the foregoing construction, it is clearly obvious that in operation, it is the oil pressure and retardation of flow, from one chamber to the other, which acts against the piston and its connection with the axle to retard the action of the vehicle spring. Observing Figure 2, and assuming that the piston 8 is driven in a direction from left to right, it will be seen that the oil in the primary chamber A will be transferred into the chamber B, through the adjustable groove in cover under restriction, thus slowing up rebound of spring. At this time, the large ball check 7 is closed. Movement of the piston in the opposite direction, however, serves to open this check valve, and to allow unretarded passage of the oil back into the primary chamber A. As before indicated, the stem 39 may be utilized for regulating the action of the ball check 7 to meet the requirement. Ordinarily, valve in piston need not be utilized except when liquid used becomes more viscous or instrument is not adjusted for colder temperature, at which time valve in piston is only a supplementary escape back to chamber "B". By considering the description in connection with the drawing, persons familiar with devices of this class will be able to obtain a clear understanding of the same. Therefore, a more lengthly description is thought unnecessary.

While the preferred embodiment of the invention has been shown and described, it is to be understood that minor changes, coming within the field of invention claimed, may be resorted to, if desired.

We claim:—

1. A shock absorber comprising a casing having an annular piston channel, said channel being bridged by an abutment, said abutment dividing the channel into separate compartments, a piston slidably mounted in said channel and movable toward and from said abutment, said abutment being provided with a valved passage, and said piston being provided with a valved passage, and operating means for the piston.

2. A shock absorber comprising a casing of circular form having an internal marginal annular piston channel, an abutment bridging said channel, said abutment being provided with a passage, a ball check valve located in said passage, an arcuate piston slidable in said channel and cooperating therewith and with said abutment to provide cooperating fluid feeding compartments, said piston being provided with a passage, and a ball check valve in said last named passage.

3. A shock absorber comprising a circular casing having a central hub, one half of the wall of which is cut-away, an abutment connected with the remaining half of the wall and with the main wall of the casing, said abutment having a fluid passage, a single ball check valve located in said passage, a piston movable in said casing and cooperable with said abutment and hub, a removable cover plate for the casing, and an adjusting screw carried by the cover plate and located over said valve for regulating return of liquid to primary chamber.

4. As a new article of manufacture, a casing for use in connection with a shock absorber of the kind described, said casing being of circular form and substantially cup-shaped, a hub rising from the center of the bottom of the casing, one half of the wall of the hub being cut away, a partition formed integral with the remaining half and with the main wall, said partition having a restricted fluid passage, and having a valve seat formed therein, the bottom of said casing being provided with a substantially semi-circular groove forming an oil socket, and defining spaced piston tracks, and apertured attaching ears carried by said casing.

5. As a new article of manufacture, a piston for use in connection with a shock absorber of the kind described, said piston comprising an arcuate body formed in its inner periphery with a pocket, and a groove leading from said pocket, the outer periphery being formed with a groove extending through one end, there being a bore connecting the inner ends of the grooves, and a spring pressed check valve located in said bore.

6. As a new article of manufacture, an oscillatory rock shaft, for use in connection with a shock absorber of the kind described, said rock shaft being provided on one end with an enlarged head, said head having a screw threaded socket, a bolt threaded into said head and having a flattened head at its outer end to act in the capacity of a coupling arm with a piston, the outer end of said shaft being provided with a transverse recess forming a keyway.

In testimony whereof we affix our signatures.

ERNEST W. ACKERMAN.
GRIFFITH C. NICHOLSON.